(12) United States Patent
Umehara et al.

(10) Patent No.: US 6,577,375 B1
(45) Date of Patent: Jun. 10, 2003

(54) LIQUID CRYSTAL DISPLAY DEVICE HAVING PARTICULAR SAPPHIRE SUBSTRATES

(75) Inventors: Motohiro Umehara, Yokaichi (JP); Hideki Banjo, Omiya (JP); Kenichi Watanabe, Gamo-gun (JP); Yoshio Ueda, Kyoto (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/473,387

(22) Filed: Dec. 28, 1999

(30) Foreign Application Priority Data

Dec. 28, 1998 (JP) ............................. 10-371720
Mar. 1, 1999 (JP) ............................. 11-052061

(51) Int. Cl.⁷ ...................... G02F 1/1333; G02F 1/1335
(52) U.S. Cl. ........................... 349/158; 349/349; 349/5
(58) Field of Search ......................... 349/158, 5, 7, 349/8; 353/81, 33, 38; 257/437

(56) References Cited

U.S. PATENT DOCUMENTS

| | | | | |
|---|---|---|---|---|
| 4,202,010 A | * | 5/1980 | Hareng et al. ................. 358/56 |
| 4,826,300 A | * | 5/1989 | Efron et al. ................. 350/342 |
| 4,864,390 A | * | 9/1989 | McKechnie et al. ........ 358/784 |
| 5,552,840 A | * | 9/1996 | Ishii et al. ................... 348/751 |
| 5,583,676 A | * | 12/1996 | Akiyama et al. .............. 349/28 |
| 5,835,179 A | | 11/1998 | Yamanaka |
| 5,900,982 A | * | 5/1999 | Dolgoff et al. .............. 359/619 |
| 5,938,307 A | * | 8/1999 | Hamada et al. ................ 353/38 |
| 5,986,740 A | * | 11/1999 | Robinson et al. ........... 349/201 |
| 6,111,696 A | * | 8/2000 | Allen et al. ................. 359/495 |
| 6,124,911 A | * | 9/2000 | Nakamura et al. ........... 349/113 |
| 6,144,360 A | * | 11/2000 | Evanicky et al. ............ 345/102 |
| 6,245,399 B1 | * | 6/2001 | Sahouani et al. ........... 428/1.31 |
| 6,255,619 B1 | * | 7/2001 | Jitsuno et al. ......... 219/121.62 |
| 6,271,903 B1 | * | 8/2001 | Shin et al. ................... 349/110 |
| 6,297,862 B1 | * | 10/2001 | Murade ......................... 349/44 |
| 6,327,443 B1 | * | 12/2001 | Sekiguchi |

FOREIGN PATENT DOCUMENTS

| | | |
|---|---|---|
| EP | 0 509 630 | 2/1992 |
| EP | 1 016 894 | 12/1999 |
| JP | 53-086593 | 7/1978 |
| JP | 61-025135 | 2/1986 |
| JP | 04-076523 | 3/1992 |
| JP | 05-341276 | 12/1993 |
| JP | 08-095035 | 4/1996 |
| JP | 08-286146 | 11/1996 |

* cited by examiner

Primary Examiner—Toan Ton
Assistant Examiner—Mike Qi
(74) Attorney, Agent, or Firm—Hogan & Hartson, LLP

(57) ABSTRACT

The present invention provides a liquid crystal display device, which includes a liquid crystal panel as one of optical components for transmitting, absorbing or reflecting light. At least any one of the optical components is comprised of a sapphire substrate. The optical components further include a lens, and a polarizer having a polarizer film and a retaining plate for retaining the polarizer film, and the liquid crystal panel may include a transparent substrate. In this case, any one of the lens, the retaining plate and transparent substrates is comprised of a sapphire substrate, and thus, it is possible to provide a transmission type liquid crystal display device which transmits light from the light source through the lens, the polarizer and the liquid crystal panel so that light is projected.

20 Claims, 9 Drawing Sheets

LIQUID CRYSTAL DISPLAY DEVICE HAVING PARTICULAR SAPPHIRE SUBSTRATES

BACKGROUND OF THE INVENTION

1. Field of the Invention

The present invention relates to a liquid crystal display device having a liquid crystal panel and, particularly, to a liquid crystal projector which projects an image of the liquid crystal panel. More specifically, the present invention relates to an improvement in a cooling structure for improving a heat resistant reliability.

2. Description of Related Art

A liquid crystal projector has been mainly used as a so-called home theater system for enjoying various movies at a home. In these days, a projection image quality has been improved by a high definition of liquid crystal panel and a high luminance brightness of lamp. Accordingly, the liquid crystal projector has been also used as a presentation system for projecting a display image of a personal computer on a projection screen.

A construction of the liquid crystal projector is shown in FIG. 1. Light generated from a light source 1 of a high luminance lamp such as a metal-halide lamp, a xenon lamp or a UHP or the like, is reflected by a spherical reflecting mirror 2. Then, light reflected by the spherical reflecting mirror 2 transmits through a filter 3 so that unnecessary infrared ray and ultraviolet ray are removed. Further, light transmitting through the filter 3 transmits through an integrator lens 4 and a condenser lens 5 so as to be condensed, and thereafter, passes through an incidence side polarizing plate 6, and thus, is incident upon a liquid crystal panel 8. Light emitted from the liquid crystal panel 8 transmits through an emission side polarizing plate 7, and thereafter, is enlarged and projected by means of a projection lens 9, and thus, an image is projected onto a screen or the like located ahead of the projector.

The aforesaid structure is of a single-panel type using a sheet of liquid crystal panel including color filters. In addition to the above single-panel type structure, a three-panel type structure is also known such that light from a light source is decomposed into decomposition lights of three primary colors of RGB, and these decomposition lights are incident upon three liquid crystal panels.

A construction of the liquid crystal projector having the above three-panel type structure is shown in FIG. 2. In FIG. 2, like reference numerals used in the case of FIG. 1 are used to designate components having the same function as components shown in FIG. 1. In the construction shown in FIG. 2, the following components are used; more specifically, dichroic mirrors 10 for transmitting or reflecting an incident light in accordance with a wavelength, a complex prism 11 for synthesizing light, and total reflection mirrors 12. Light, which is generated from the light source 1 and reflected by the spherical reflecting mirror 2, transmits through the filter 3 and the integrator lens 4, and thereafter, is guided to the dichroic mirrors 10 after its optical path is bent by one of the total reflection mirrors 12. Then, light from the light source 1 is decomposed into three primary color lights of red (R), green (G) and blue (B) by means of two dichroic mirrors 10 for reflecting or transmitting light having different wavelength band. Then, these decomposition lights are transmitted through the liquid crystal panel 8 corresponding to each of three primary colors, and thereafter, are synthesized by the complex prism 11, and thus, are projected.

In these liquid crystal projectors, there is a tendency for a projected image to be short of a brightness. The first factor is light absorption by polarizers 6 and 7 located front and rear the liquid crystal panel 8. The second factor is that the liquid crystal panel 8 has an area made small up to a size of about 1 inch in order to miniaturize the liquid crystal projector. More specifically, in the case where an image of the liquid crystal panel 8 having a small area is enlarged and projected to several tens of inches to several hundreds of inches, there is the case where the projected image is short of a brightness.

In order to solve these problems as described above, high output lamps such as high-luminance metal-halide lamp, Ultra High Pressure Mercury lamp and xenon lamp are used as the light source 1. However, in particular, in the presentation system, demands for further miniaturization, high definition and high luminance are made in the market and a higher output lamp is selected.

For this reason, in the liquid crystal projector system, a disadvantage by a heat is a significant problem.

For example, in general, an iodine-based polarizer is used as the polarizer constituting a liquid crystal display section. However, the iodine-based polarizer is not sufficient in light resistance, heat resistance and damp and heat resistance. For this reason, in particular, in the liquid crystal projector, a dye-based polarizer is used because of being excellent in light resistance, a heat resistance and a damp and heat resistance (see Unexamined Patent Publications (Kokai) No. 9-22008 and 9-22009)

However, in particular, the incidence side polarizer 6 has light transmittance of about 40%, and absorbs most of lights. Further, the polarizer 6 can not maintain its characteristic when becoming a temperature of 70° C. or higher.

Moreover, the liquid crystal panel 8 itself is weak in a heat, and its characteristic is remarkably deteriorated when becoming a temperature of 60° C. or higher.

In order to solve the above problem, in the liquid crystal projector, the following various cooling systems have been proposed.

(1) Air cooling system

Heat generating sections such as the incidence side polarizer 6, the liquid crystal panel 8 and the emission side polarizer 7, the light source 1 and a power source section, are cooled by means of a cooling fan, and then, an air having a heat is exhausted.

However, according to this air cooling system, there are a noise problem and a problem that a dust adheres to the liquid crystal panel 8. More specifically, in the case where an air supply is increased in order to obtain sufficient cooling effect, a fan is rotated at a high speed, and is made into a large size, and thereby, a large noise is generated. For this reason, it is not preferable to apply the above air cooling system to a liquid crystal projector which is used for conducting a presentation in a silent room or for enjoying a movie or the like.

(2) As shown in FIG. 1, the incidence side polarizer 6 is arranged in a state of separating from the liquid crystal panel 8 with a distance of about 1 to 5 mm. By doing so, it is possible to prevent a heat of the polarizer 6 from conducting directly to the liquid crystal panel 8. Further, a cooling air flows between the polarizer 6 and the liquid crystal panel 8, and thereby, a cooling efficiency can be enhanced.

In this system, the incidence side polarizer 6, which is a principal heat generating source, is arranged separately and independently, and thereby, an influence to the liquid crystal panel 8 is reduced, and a heat radiating effect can be improved. However, there is a limit in the cooling effect. Moreover, a blue sheet glass or white sheet glass is used as a retaining plate of a polarizing substance in the polarizer 6. In the blue or white sheet glass, the heat conductivity is worse and a heat radiating effect is insufficient. Therefore, like the case of the above air cooling system, finally, an output of the cooling fan must increased. As a result, it is impossible to solve the above problems relating a noise and dust adhesion.

(3) A heat radiating glass plate having a heat conductivity of 1 W/m.K or more is located on an outer surface of the liquid crystal panel 8 with a sealed space interposed therebetween, so as to enhance a heat radiating effect with respect to a heat generation of the liquid crystal panel 8. Further, a cooling air is supplied to the heat radiating glass plate so as to prevent a dust from adhering to the liquid crystal panel 8.

According to the above system, no dust adheres to the outer surface of the liquid crystal panel 8. Since a surface of the heat radiating glass plate diverges from a focal plane, even if a dust adheres to the surface of the heat radiating glass plate, the image of the dust is not imaged on a projection screen, and no influence is given to a projection image. However, a heat conductivity is 2 W/m.K or less at most even though the glass plate has a high heat conductivity and, therefore, sufficient heat radiating effect can not be obtained.

(4) Liquid cooling system

A liquid is encapsulated as a heat exchange medium in a space formed by a transparent panel arranged along the outer surface of the liquid crystal panel, and thus, a cooling effect is enhanced (see Examined Patent Publication (Kokoku) No. 6-58474).

According to the above liquid cooling system, with a temperature rise, there is the possibility that a pressure reduction is required, or a bubble is generated. Moreover, there is the possibility that a foreign matter gets mixed in the liquid used as a cooling medium, or the cooling medium leaks. For these reasons, in the liquid cooling system, the reliability is worse. In addition, the liquid is used and, therefore, the cooling system is a large scale as a whole. As a result, there is a problem that the whole of liquid crystal projector is made into a large size.

(5) Electronic cooling system using a Peltier element (solid cooling system)

An electronic cooling system with a Peltier element is attached to a heat generating source so as to forcedly cool the heat generating source.

According to such electronic cooling system, equipments for the electronic cooling system are required and there is a problem that the cost spent for the whole liquid crystal projector is greatly increased. In addition, a sufficient cooling effect can not be obtained.

(6) A polarized light converter is arranged just after a light source

Before light from the light source 1 is incident upon the polarizer 6, a polarizing direction is aligned with a transmission polarization axis of the polarizer 6 so as to reduce a quantity of light absorbed into the polarizer 6.

However, in this case, since about 20% of light incident upon the polarizer 6 is absorbed by the polarizer 6, there is the case where a sufficient cooling effect is not always obtained. More specifically, for example, the liquid crystal panel 8 is made into a small size, and the lamp intensity per unit area becomes higher, and thereby, there is the case where a sufficient cooling effect is not obtained.

As seen from the above description, even if the aforesaid conventional cooling systems are employed, a sufficient cooling effect can not be obtained with a simple structure.

The problem of generating a heat raises in various portions other than the polarizer 6.

For example, a pixel electrode and a switching element are formed on an incidence side transparent substrate which is a constituent element of the liquid crystal panel 8. At present, the transparent substrate is constructed with the use of a silica glass substrate having a low heat conductivity of about 1 or 2 W/m.K. For this reason, it is impossible to effectively release a heat accumulated in the liquid crystal panel 8.

Recently, a panel size is made small, and thereby, light quantity per unit area increases. In addition, in order to improve an aperture ratio, a micro lens is used so that an incident light is condensed and transmitted for each pixel. Thus, as seen from the above explanation, a thermal load acting on the liquid crystal panel itself becomes greater.

In a driving circuit, its operating speed is slow because in a liquid crystal display unit using a polysilicon thin-film transistor as conventionally, a mobility of polysilicon is slow. In addition, since a leakage current is large due to a fault of polysilicon, there is a problem that power consumption is much.

On the other hand, in the liquid crystal projector having the construction as shown in FIG. 2, the dichroic mirrors 10 are used. The dichroic mirrors 10 are manufactured in a manner of coating a thin film, which selects a wavelength of the light and carries out transmission/reflection, on the surface of a blue sheet glass or white sheet glass. The dichroic mirrors 10 also cause a heat generation by light absorption and, therefore, the temperature of apparatus rises up as a whole.

Moreover, there is the case where an infrared ray is previously cut from light incident upon an optical system from the light source 1 so as to restrict a heat generation. The blue sheet glass or white sheet glass is used as the filter 3 (see FIG. 2) for cutting an infrared ray. Since these sheet glasses have low heat conductivity, a heat is accumulated. As a result, this is a factor of a temperature rise in the whole of apparatus.

Meanwhile, since the single light source 1 is used, the integrator lens 4 is used in order to diffuse a light source intensity and make uniform illuminance of an irradiation surface. In general, the integrator lens 4 has the following structure; more specifically, an optical glass such as Pyrex glass is subjected to mold pressing, and many lenses thus manufactured are made into a single plate. Further, in order to improve a characteristic, there is the case where a material such as silica glass is used, and a total reflection of the side plane of a prism made of silica glass is utilized. In this case, the silica glass has a low refractive index of about 1.46 and, therefore, the total reflection angle becomes large. As a result, a length of the prism rod must be set longer. Moreover, there is a problem that the number of pseudo light sources is small.

SUMMARY OF THE INVENTION

It is, therefore, an object of the present invention to provide a liquid crystal display apparatus which includes a simple and effective cooling structure.

Another object of the present invention is to provide a projection type liquid crystal display apparatus (liquid crystal projector) which includes a simple and effective cooling structure.

Still another object of the present invention is to provide a liquid crystal display apparatus which has a fast operating speed, low power consumption and excellent radiation property, and is adaptable to miniaturization and high definition.

The present invention provides a liquid crystal display device, which includes a liquid crystal panel as one of optical components for transmitting, absorbing or reflecting light, any one of the optical components being comprised of a sapphire substrate.

According to one embodiment of the present invention, the liquid crystal display device further includes a light source, and the optical components transmits and projects light from the light source, thereby constructing a projection type display device.

More specifically, the optical components may further include a lens, and a polarizer having a polarizer film and a retaining plate for retaining the polarizer film, and the liquid crystal panel includes a transparent substrate, and further, any one of the lens, the retaining plate and the transparent substrate is comprised of a sapphire substrate, and thus, light from the light source may be transmitted through the lens, the polarizer and the liquid crystal panel so as to be projected.

Further, the optical components may further include a wavelength selective optical component for transmitting or reflecting light having a specific wavelength band, a lens, and a polarizer having a polarizer film and a retaining plate for retaining the polarizer film, and the liquid crystal panel includes a transparent substrate. Any one of the wavelength selective optical component, the lens, the retaining plate and the transparent substrate may be comprised of a sapphire substrate, and light from the light source may be transmitted through the lens, the polarizer and the liquid crystal panel so as to be projected.

In this case, the wavelength selective optical component may be a filter (for example, an infrared cut filter or an ultraviolet ray cut filter).

Moreover, the wavelength selective optical component may be a dichroic mirror.

With the above construction, the sapphire substrate having a high heat conductivity is used as a transparent substrate in the liquid crystal projector, and thereby, a heat radiating effect can be enhanced. More specifically, sapphire, which is excellent in heat conductivity, is used as various components of the liquid crystal display device, and thereby, a heat radiating effect can be improved. Therefore, it is possible to realize a high-luminance and small-size liquid crystal projector without causing a problem of characteristic deterioration by a heat generation.

Further, a metallic radiation fin may be bonded to the sapphire substrate, and thereby, a heat radiating effect can be improved more.

The transparent substrate of the liquid crystal panel may perform a function as the retaining plate of the polarizer film. More specifically, the polarizer film may be supported onto the surface of the transparent substrate of the liquid crystal panel.

Preferably, the sapphire substrate is constructed in a manner that an angle made by a C-axis direction or C-axis projection line direction and a polarized light transmission axis is set within a range of ±2°, or an angle made by an axis perpendicular to the C-axis and a polarized light transmission axis is set within a range of ±2°, or an angle made by a C-plane and a plane vertical to a transmission direction of a polarized light to be transmitted is set within a range of ±2°.

Whereby it is possible to prevent an influence to polarizing characteristic.

The lens may be an rod-type integrator lens for diffusing light from the light source, and the integrator lens may be formed of sapphire. More specifically, the sapphire has a high refractive index, so that it is possible to make small a total reflection angle, and to improve a diffusion of light from the light source.

A transparent adhesive agent having a Shore hardness of 30 or less may be applied onto the polarizer film or the liquid crystal panel so as to form a thickness of 10 to 70 $\mu$m, and then, the sapphire substrate may be aligned and bonded thereto. Whereby it is possible to prevent a deformation of the liquid crystal panel generated by a difference of thermal expansion, and thereby, to reduce an influence to an image while preventing a failure in a heat conductivity The sapphire substrate may be attached onto an outer surface of the liquid crystal panel so as to be sealed with a space of 0.1 mm or less interposed therebetween. Whereby the sapphire has no influence to the liquid crystal panel, and a generated heat is effectively conducted via a micro space, and thus, a cooling effect can be enhanced.

Further, in the case of attaching the sapphire substrate is attached onto an outer surface of the liquid crystal panel, preferably, light shielding layer having a window of a size larger by 0.1 mm or more than an effective pixel area of the liquid crystal panel is applied to the sapphire substrate. Whereby it is possible to prevent a projected image from receiving an influence of scattering light from the surroundings.

The liquid crystal panel may include a first transparent substrate and a second transparent substrate facing each other with a liquid crystal layer sandwiched therebetween. In this case, it is preferable that at least one of the first transparent substrate and the second transparent substrate is comprised of a sapphire substrate.

Further, the liquid crystal panel may include a first sapphire substrate and a second sapphire substrate used as a pair of transparent substrates facing each other with a liquid crystal layer sandwiched therebetween.

In this case, preferably, the first sapphire substrate whose primary plane is any one of an R-plane, an A-plane, an M-plane and a C-plane, and the second sapphire substrate whose primary plane is any one of an R-plane, an A-plane, an M-plane and a C-plane. Further, preferably, the first sapphire substrate and the second sapphire substrate face each other so that each specific crystal axis of them substantially coincide with a polarization transmission axis of polarized light to be transmitted.

In this case, preferably, the liquid crystal panel further includes pixels which are arranged in a matrix on the first sapphire substrate so as to be aligned with a specific crystal axis direction of the first sapphire substrate, a vertical scanning circuit and a horizontal scanning circuit which are formed with the use of a thin film transistor comprised of silicon made by epitaxial growth on the first sapphire substrate, and send a video signal to the pixels, and a transparent electrode formed on the second sapphire substrate.

Preferably, the pixels are arranged in a matrix so as to be substantially parallel with or perpendicular to the specific crystal axis direction of the first sapphire substrate.

Preferably, the first and second sapphire substrates are constructed in a manner that an angle made by each specific crystal axis of them and a polarization transmission axis of a polarized light to be transmitted is set within a range of ±2°.

Each specific crystal axis of the first and second sapphire substrates may be an A-axis or C-axis projection line direction in the case where its primary plane is an R-plane, may be a C-axis or M-axis direction in the case where its primary plane is an A-plane, may be C-axis or A-axis direction in the case where its primary plane is an M-plane, and may be an A-axis or M-axis direction in the case where its primary plane is a C-plane.

The liquid crystal panel has a structure in which the polarizers are arranged on both sides of the panel so that their polarizing directions cross at right angle, and a liquid crystal layer is interposed between the polarizers. When an electric field is an on state, a liquid crystal stands up. In the case where the electric field is an off state, on the other hand, the liquid crystal is twisted. By making use of this charcteristic, the liquid crystal performs a function as a switch for shielding or transmitting light. Therefore, an image can be formed by carrying out an on/off control of electric field for each pixel.

The specific axis orientation of the sapphire substrate is made coincident with an arrangement direction of the pixels and the polarizing direction of the polarized light to be transmitted, whereby it is possible to prevent the sapphire substrate from giving an influence to a polarizing characteristic. Whereby it is possible to realize a high-luminance and small-size liquid crystal projector which is excellent in a heat radiating effect without causing a problem of characteristic deterioration by a heat generation.

Moreover, the specific axis and crystal orientation of the sapphire substrate is controlled as described above, and thereby, it is possible to faithfully maintain a polarizing characteristic, and to realize a liquid crystal projector which can project an image.

Moreover, the pixels arranging on the sapphire substrate in a matrix, and the vertical and horizontal scanning circuits are formed of SOS (silicon on sapphire) thin film transistors, and thus, an active matrix type liquid crystal display device is constructed, thereby making it possible to increase an operating speed and to reduce a power consumption. In addition, since an ordinary semiconductor process can be employed, mass production is possible and, therefore, it is possible to realize a liquid crystal display device having various effects.

In the above embodiments, it is preferable that antireflection coating is subjected onto a surface of the sapphire substrate. Whereby it is possible to improve the transmittance.

The above and further objects, features and effects of the invention will becomes apparent from the following detailed description with reference to the accompanying drawings.

DESCRIPTION OF THE PREFERRED EMBODIMENT

Figure 1:
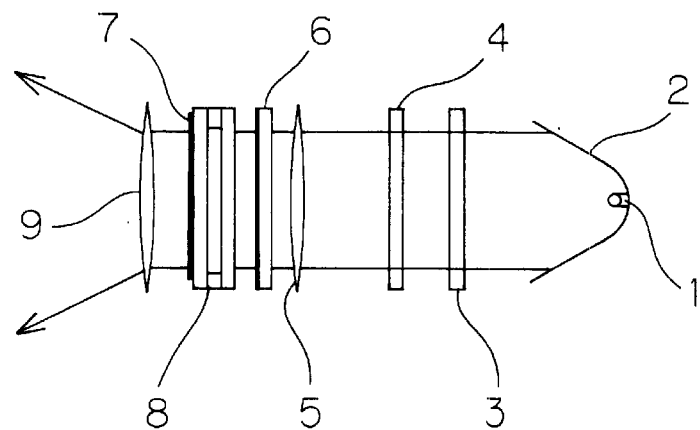
FIG. 1 is a view schematically showing a construction of a transmission liquid crystal single-panel type projector.
Figure 2:
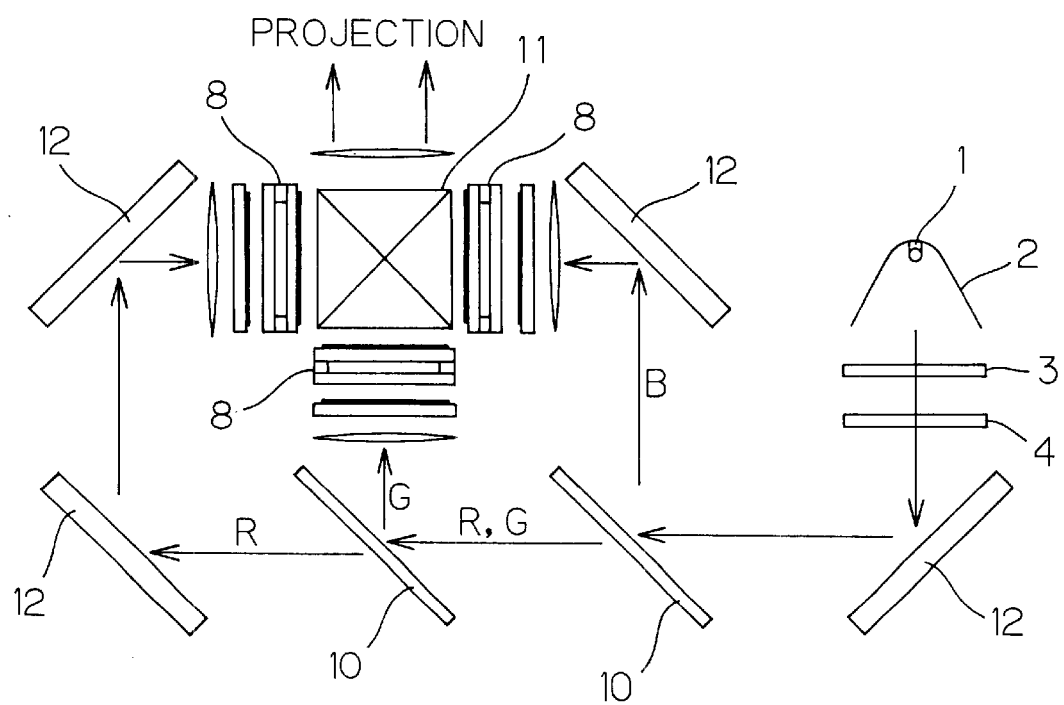
FIG. 2 is a view schematically showing a construction of a transmission liquid crystal three-panel type projector.

According to one embodiment of the present invention, in the liquid crystal projector having the construction shown in FIG. 1 or FIG. 2, at least one of the optical components is formed of a sapphire substrate. The optical components include: dichroic mirrors 10; a filter 3; a lens 4; a retaining plate of a polarizer film (material) in the polarizer 6,7; and a transparent substrate constituting the liquid crystal panel 8. A sapphire substrate has high heat conductivity, so that a heat generated from the optical components can be effectively radiated.

First, the following is a description on an embodiment using a sapphire substrate as the retaining plate of the polarizer 6,7.

Figure 3:
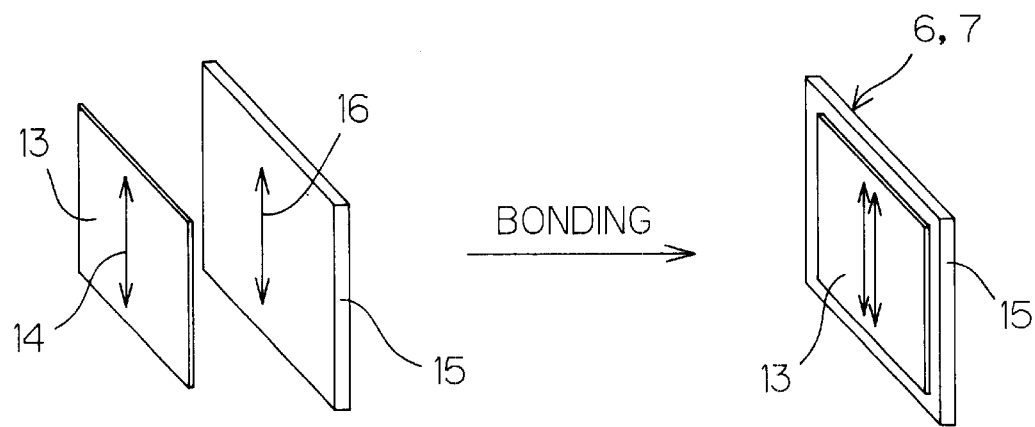
FIG. 3 is a view showing a construction of a polarizer used in a liquid crystal projector according to one embodiment of the present invention.

As shown in FIG. 3, the polarizer 6, 7 is manufactured in a manner of bonding a polarizer film 13 to a surface of a retaining plate 15 comprised of a sapphire substrate by means of a sheet-like transparent bonding agent interposed therebetween. In this case, the polarizer film 13 and the retaining plate 15 are bonded together so that an angle made by a transmission polarizing axis 14 of the polarizer film 13 and an axis 16 is set within a range of ±2°, preferably, ±0.5°. The axis 16 is a C-axis of the sapphire substrate constituting the retaining plate 15 or an axis indicating a C-axis projection line direction or an axis (e.g., M-axis) perpendicular to the C-axis. This serves to prevent a polarized light shaped by the polarizer film 13 from generating an optical rotation resulting from a birefringence or double refraction in a sapphire crystal. In the case where the angle made by the two axes is set more than the above angular range, any influence such as disturbance appears in an image projected from the liquid crystal projector.

Figure 4:
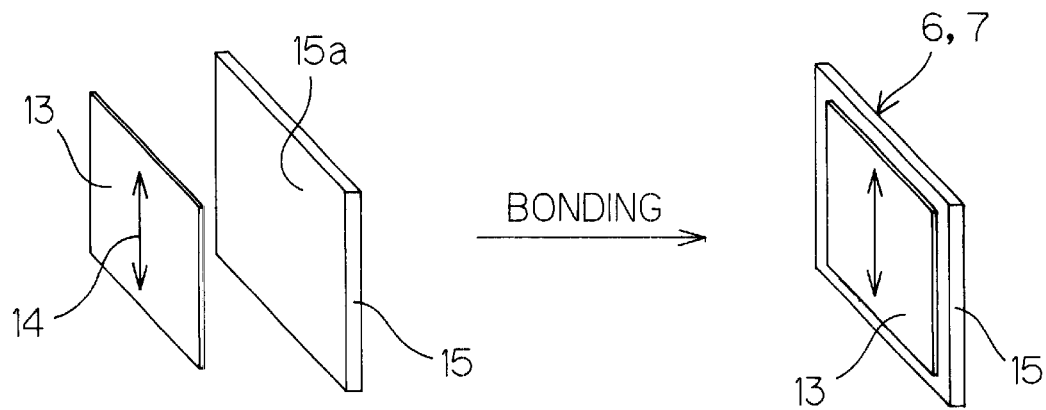
FIG. 4 is a view showing a construction of a polarizer used in a liquid crystal projector according to another embodiment of the present invention.

Moreover, as shown in FIG. 4, a surface orientation of a primary plane 15a of the retaining plate 15 comprised of the sapphire substrate is set within a range of C-plane ±2°, preferably, ±0.5°. Whereby a stable image can be obtained without receiving an influence by double refraction.

Figure 5:
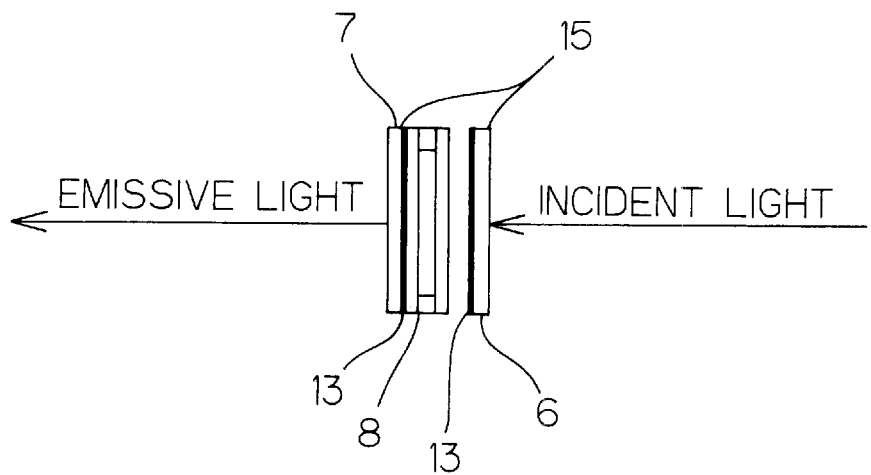
FIG. 5 is a view showing a liquid crystal panel including the polarizer shown in FIG. 3 or FIG. 4.

FIG. 5 shows a state that the polarizers 6 and 7 aligned as shown in FIG. 3 are set front and rear the liquid crystal panel 8, and light is irradiated thereto. In this case, the incidence side polarizer 6 is arranged separating from the liquid crystal panel 8 with a distance of 1 to 5 mm. On the other hand, the emission side polarizer 7 is directly applied to the liquid crystal panel 8 by means of a sheet-like transparent bonding agent in a state that the polarizer film 13 faces the surface of the liquid crystal panel 8.

The polarizers 6 and 7 are constructed in a manner of applying the polarizer films 13 to the retaining plates 15 comprised of sapphire substrates having a high heat conductivity of 42 W/m.K. Thus, a heat accumulated by absorption of light incapable of transmitting through the polarizer film 13, is conducted to the sapphire substrate, so that the heat can be effectively radiated. These polarizers are used in combination with a cooling fan, and thereby, a heat of the polarizers 6 and 7 can be effectively radiated.

In order to obtain the best display contrast of the liquid crystal panel 8, in the polarizer 6, it is preferable that the polarizer film 13 applied onto the retaining plate 15 is arranged on the liquid crystal panel 8 side so as to face the panel 8. Moreover, in the polarizer 7, it is preferable that the polarizer film 13 applied onto the retaining plate 15 is arranged on the liquid crystal panel 8 side so as to face the panel 8.

The reason is because it is significant that change in a polarizing characteristic of light before and after transmitting through the liquid crystal panel 8 is made as little as possible. Even if the retaining plate 15 made of sapphire is accurately set in its crystal axis orientation and crystal orientation, light transmitting through the retaining plate 15 receives some changes in its polarizing characteristic. Therefore, the polarizer film 13 is arranged on the liquid crystal 8 side, and thereby, it is possible to realize a contrast characteristic of the same level as the case of using no sapphire substrate (e.g., the case of using a glass substrate).

Figure 6:
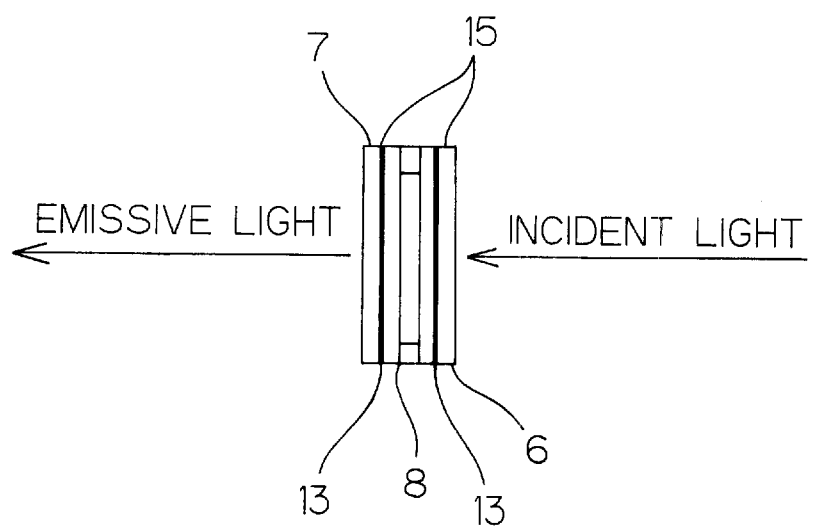
FIG. 6 is a view showing a liquid crystal panel including the polarizer shown in FIG. 3 or FIG. 4.

As shown in FIG. 6, the incidence side polarizer 6 may be applied directly onto the surface of the liquid crystal panel 8. In this case, the sapphire substrate having preferable heat conductivity is used as the retaining plate 15, and thereby, a sufficient heat radiating effect can be obtained. In this structure, a cooling air does not reach the surface of the liquid crystal panel 8 and, therefore, no dust adheres to the surface. A dust may adhere to the surface of the retaining plate 15. However, the surface of the retaining plate 15 diverges from a focal plane of a projection optical system, so that an image of the dust is not vividly imaged on a projection screen. As a result, by the structure as shown in FIG. 6, it is possible to prevent a deterioration of quality of the projected image.

Preferably, the sapphire substrate used as the retaining plate 15 is subjected to antireflection coat at its one side or both sides so as to improve its transmitivity. In this case, it is preferable that in the antireflection coat, coating characteristic is made different between a bonding surface with the polarizer film and a surface contacting with an air, so as to meet a refractive index of a contacting layer (polarizer film 13 or air). This further improves the transmitivity.

For example, a surface of the sapphire substrate (retaining plate 15) contacting with an air may be subjected to antireflection coat with respect to the refractive index of about 1.0. In this case, it is preferable that the antireflection coating has a refractive index within a range of 1.3±0.15. To give an example, $MgF_2$ having a refractive index of 1.38 is applicable as the antireflection coat. Moreover, preferably, a bonding surface with another member (polarizer film 13) is subjected to antireflection coat with respect to a refractive index of 1.38 to 1.55 so as to meet a transparent adhesive agent which will be described later.

It is preferable to provide a frame-like light shielding film on a sapphire substrate used as the polarizer 7 arranged on the emission side of the liquid crystal panel 8. The light shielding film has a window. Preferably, the window has a size which is 0.1 mm or more larger than an effective pixel area of the liquid crystal panel 8, and has a transmittance of 1% or less. Whereby it has been confirmed that it is possible to solve the problem that a contrast of a projected image lowers due to an influence of a scattering light from the surrounding. The light shielding film may be formed by silk screen printing, or may be formed of a chrome-based deposition film.

In fact, in the case where the polarizers 6 and 7 are constructed with the use of the sapphire substrate as the retaining plate 15, these polarizers 6 and 7 individually have an improvement of 10 to 15° C. or more in their cooling effect as compared with the conventional case of using the blue sheet glass or white sheet glass as the retaining plate.

Next, the following is a description on an embodiment of using a sapphire substrate as a transparent substrate constituting the liquid crystal panel 8.

The liquid crystal panel 8 has a structure in which a liquid crystal is held between an incidence side transparent substrate and an emission side transparent substrate. Pixel electrodes and switching elements are formed on the incidence side transparent substrate. Facing electrodes are formed on the emission side transparent substrate. Thus, the incidence side and/or emission side substrate is composed of a sapphire substrate. Or, apart from the transparent substrate of the liquid crystal panel 8, a transparent substrate comprised of the sapphire substrate may be provided on the incidence side and/or emission side substrate of the liquid crystal panel 8.

Figure 7:
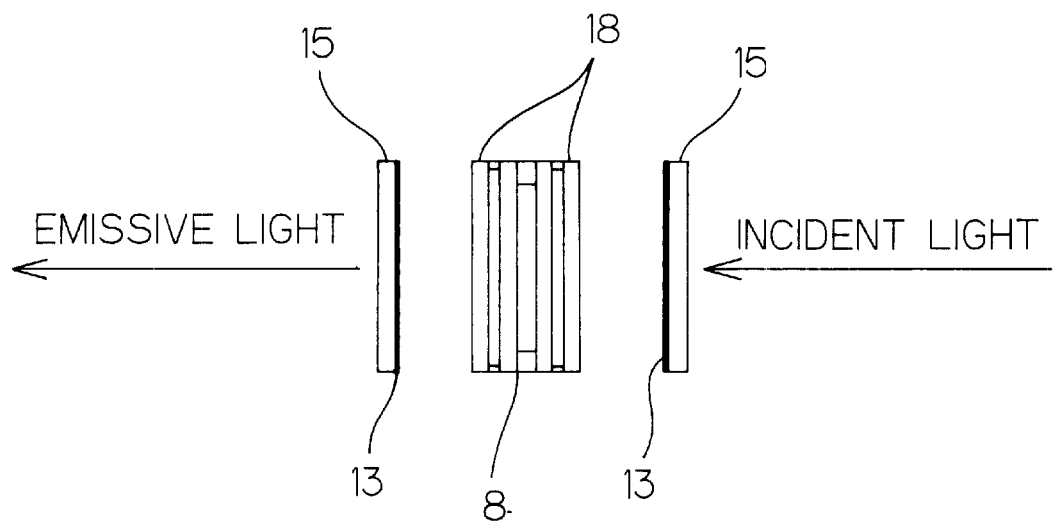
FIG. 7 is a view showing a liquid crystal panel according to still another embodiment of the present invention.

FIG. 7 shows an embodiment of providing transparent substrates 18 comprised of sapphire substrates on the incidence side and emission side of the liquid crystal panel 8 apart from the liquid crystal panel 8. The transparent substrate 18 is bonded to the liquid crystal panel 8 in a state of forming a space of 0.1 mm or less between the outer surface of the transparent substrate of the liquid crystal panel 8 and the transparent substrate 18, and closing the formed space.

In the liquid crystal panel 8 used in the liquid crystal projector, no beads is encapsulated in a liquid crystal layer in order to keep the space constant. Because, if the beads were encapsulated in the space, a quality of an enlarged and projected image would be lost. Therefore, in a pair of transparent substrates constituting the liquid crystal panel 8, a mutual interval is kept by only seal layer of an outer peripheral portion surrounding the liquid crystal layer. In the case where the sapphire transparent substrate is mounted to the outer surface of the liquid crystal panel 8 in a state of contacting therewith, the surface of the liquid crystal panel 8 is deformed by a thermal expansion due to a temperature change. For this reason, ununiformity is generated in the liquid crystal layer. As a result, a quality of a projected image is worsened.

So, in this embodiment, the transparent substrate 18 are arranged with spaces from the surfaces of the liquid crystal panel 8. On the other hand, in order to effectively conduct an accumulated heat of the liquid crystal panel 8 to the transparent substrates 18, it is preferable to make narrow spaces between the liquid crystal panel 8 and the transparent substrates 18 as much as possible. The space may be set to 0.1 mm or less, and thereby, it is possible to prevent a surface deformation of the liquid crystal panel 8, while securing a heat radiating effect.

Moreover, in this embodiment, the transparent substrates 18 have been bonded to the liquid crystal panel 8 with the closed spaces sandwiched therebetween. In place of the spaces, the transparent substrates 18 may be stuck onto the surfaces of the liquid crystal panel 8 with a sheet-like transparent adhesive agent or bonding agent interposed therebetween that has a flexibility. In this case, as shown in the Table 1, the transparent adhesive agent having a Shore hardness of 30 or less may be used, and thereby, it is possible to preferably secure an image quality. Moreover, in the case of taking an influence to the image quality into consideration, if a thickness of the transparent adhesive agent is set to 10 µm or more, there is no problem. An experiment was conducted in order to confirm a cooling performance by heat conduction. As a result, as shown in the Table 2, it can be seen that a preferable cooling effect is obtained if the thickness of the transparent adhesive agent is set to 70 µm or less.

TABLE 1

| Adhesive agent hardness (Shore hardness) | Image quality (including bond quality) |
|---|---|
| 10 | O |
| 20 | O |
| 30 | Δ |
| 40 | X |
| 50 | X |
| 60 | X |

TABLE 2

| Thickness of adhesive layer (mm) | Image quality (including bond quality) | Cooling effect |
|---|---|---|
| 5 | X | O |
| 10 | Δ | O |
| 15 | O | O |
| 20 | O | O |
| 30 | O | O |
| 40 | O | O |
| 50 | O | O |
| 60 | O | O |
| 70 | O | Δ |
| 80 | O | Δ |
| 90 | O | Δ |
| 100 | O | Δ |
| 110 | O | X |
| 120 | O | X |

In Table 1 and Table 2, a symbolic mark "o" is given in the case where a preferable result is obtained, a symbolic mark "Δ" is given in the case where the result within a allowable limit range is obtained, and a symbolic mark "X" is given in the case where the result not being allowable is obtained.

The transparent substrates 18 are arranged on both incidence side and emission side of the liquid crystal panel 8, and thereby, a higher heat radiating effect can be realized. It is possible to obtain a high heat radiating effect even if the transparent substrate is arranged on only one side. Moreover, an antireflection coat may be subjected to one surface or both surfaces of the sapphire substrates constituting the transparent substrates 18, and thereby, it is possible to improve a transmission characteristic.

In the sapphire substrates constituting the transparent substrates 18, an angle made by a C-axis of the sapphire substrate or a C-axis projection line or an axis perpendicular to the C-axis is set within a range of ±2°, preferably ±0.50, with respect to a polarization axis of a polarized light to be transmitted. Whereby it is possible to prevent a deterioration of a projected image quality due to light rotation. In addition, a surface orientation of the sapphire substrate may be set within a range of ±2°, preferably ±0.5°, with respect to the C-surface, and thereby, it is possible to prevent from giving an influence to the projected image quality.

Further, in this embodiment, the surface of the liquid crystal panel 8 is covered with heat radiating plates comprised of the sapphire transparent substrates 18. Even if a dust adheres to the transparent substrates 18, no hindrance is generated in an image quality. Because a focal plane of a projection optical system is aligned with the liquid crystal panel 8, and the surface of the transparent substrate 18 diverges from the focal plane. According to the experiment, a distance of 1 mm or more was required between the liquid crystal panel 8 and the surface of the transparent substrate 18 (the surface opposite to the liquid crystal panel 8).

In addition, with the use of the retaining plates 15 constituting the polarizers 6 and 7 composed of the sapphire substrate, the following effect was obtained; more specifically, a liquid crystal panel surface temperature lowered about 5° C. or more.

Figure 8:
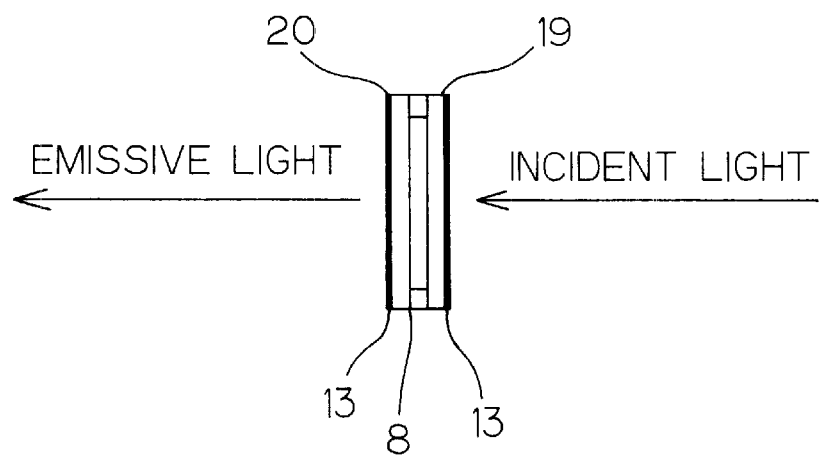
FIG. 8 is a view showing a liquid crystal panel according to still another embodiment of the present invention.

FIG. 8 shows an embodiment in which an incidence side transparent substrate 19 and an emission side transparent substrate 20 constituting a transmission type liquid crystal panel 8 are composed of sapphire substrates.

In first and second sapphire substrates 19 and 20, the following construction is required; more specifically, an angle made by a polarization axis of a polarized light to be transmitted and an axis is set within a range of ±2°, preferably ±0.5°. The axis is a C-axis of a crystal axis of sapphire substrate or a C-axis projection line or an axis perpendicular to the C-axis. Alternatively, a surface orientation of the sapphire substrate may be set within a range of ±2°, preferably ±0.5°.

In this construction, the transparent substrates 19 and 20 constituting a transmission type liquid crystal panel 8 are composed of sapphire substrates having a sufficient heat radiating effect. Thus, there is no need of specifically providing the polarizing plate, because the polarizer film 13 may be bonded directly to each outer surface side of the transparent substrates 19 and 20. By doing so, the transparent substrates 19 and 20 also functions as a retaining plate of the polarizer film 13. Therefore, it is possible to provide a compact structure at a low cost.

In this case, an antireflection coat may be subjected to one surface or both surfaces of the sapphire substrate, and thereby, it is possible to further improve a transmission characteristic. However, in general, the transparent adhesive agent for bonding the polarizer film 13 has a refractive index of 1.4 to 1.5, and also, performs a function of partially antireflection. Thus, even if no antireflection coating is subjected in particular, it is possible to realize a preferable transmission characteristic. Of course, antireflection coating may be subjected to the sapphire substrates according to a refractive index of the transparent adhesive agent, and thereby, the transmission characteristic can be further improved.

In the structure shown in FIG. 8, in the case where a cooling structure combining a cooling fan is employed, it is possible to realize a temperature reduction effect of about 15 to 20° C. and a temperature distribution uniformity as compared with the case of forming the same structure as above with the use of quartz substrates. Further, an optical path of an optical system can be shortened about 5%.

Figure 9:
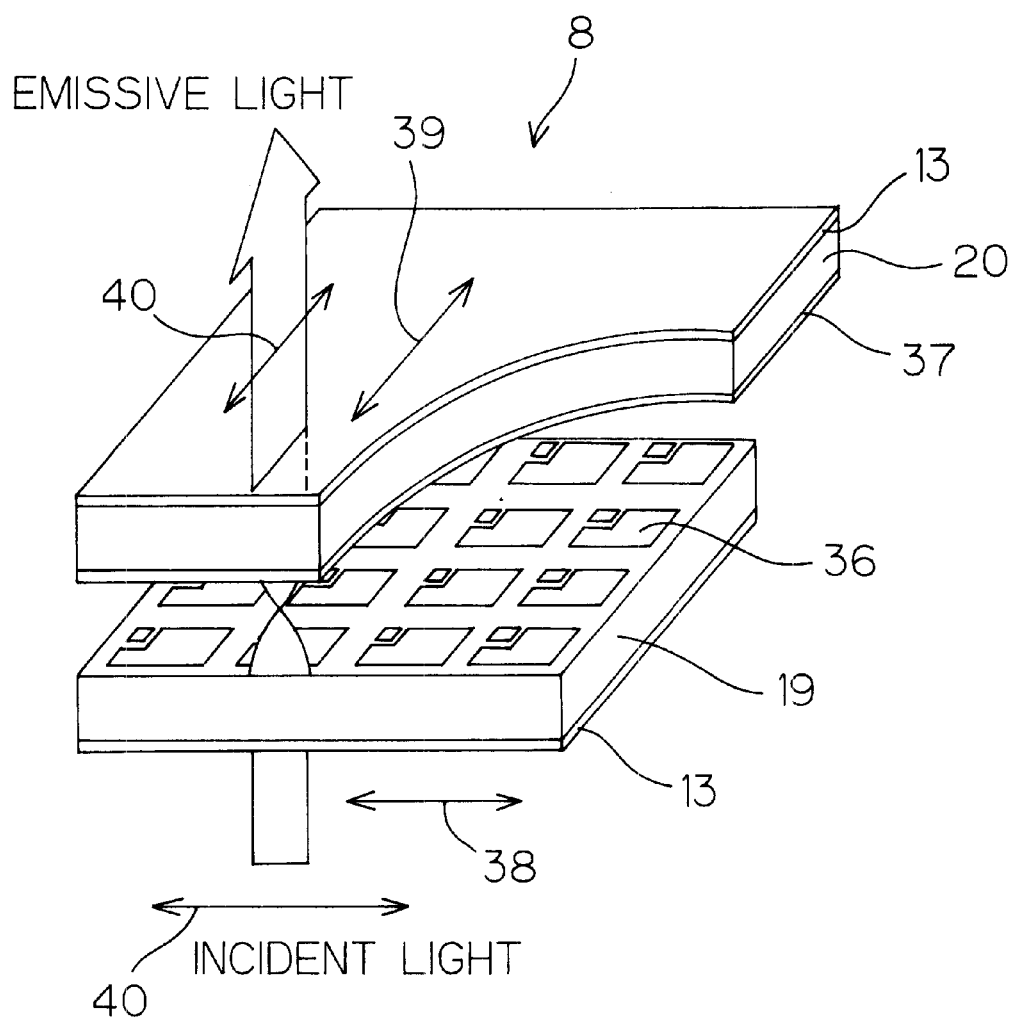
FIG. 9 is an exploded perspective view showing a construction of a liquid crystal display device according to still another embodiment of the present invention.

FIG. 9 shows a structure of a liquid crystal panel 8 according to another embodiment. In FIG. 9, like reference numerals are used to designate portions corresponding to the components shown in FIG. 8.

The first sapphire substrate 19 is formed with pixels 36, in a anatrix pattern on its inside surface, each including a pixel electrode and switching element, and the polarizer film 13 is stuck onto the outer side of the sapphire substrate 19 so as to be aligned with the matrix pattern. Moreover, the second sapphire substrate 20 facing the first sapphire substrate 19 is formed with a transparent facing electrode 37, and another polarizer film 13 is stuck onto the outer side of the sapphire substrate 20. The polarization axis directions of the two polarizer films 13 are perpendicular to each other. A liquid crystal is encapsulated between the first and second sapphire substrates 19 and 20 faced in the aforesaid manner, and thus, the liquid crystal panel is formed.

It is assumed that a polarized light 40 shaped into a polarization direction 38 is incident from the outside of first sapphire substrate 19. A liquid crystal vertically stands in a pixel whose electric field is in an on state and, therefore, the polarized light 40 straight advances through the pixel with the polarization direction remain unchanged. The polarized light 40 is therefore absorbed by the emission side polarizer film 13, and then, the pixel becomes a black indication. In a pixel whose electric field is in an off state, since the liquid crystal becomes in a twisted state, the polarized light 40 is rotated by an angle of 90° in its polarization direction, and then, has a polarization direction 39. Thus, the polarized light 40 passes through the emission side polarizer film 13, so that the pixel becomes an operating or lighting state.

In the first and second sapphire substrates 19 and 20, one of R-plane, A-plane, M-plane and C-plane is used as a primary plane. A specific crystal axis direction of each of sapphire substrates 19 and 20, is substantially coincident with an arrangement direction of the pixels 36 and a polarization axis direction of polarized light to be transmitted. In this case, the above specific crystal axis direction is an A axis or C axis projection line direction in the case where the primary plane is the R-plane, is a C-axis or M-axis direction in the case where the primary plane is the A-plane, is a C-axis or A-axis direction in the case where the primary plane is the M-plane, and is an A-axis or M-axis direction in the case where the primary plane is an M-plane.

More specifically, the specific crystal axis direction of the first sapphire substrate 19 and the arrangement direction of the pixels 36 are set substantially parallel or perpendicular, and an angle made by the specific crystal axis direction of the first sapphire substrates 19 and 20 and the polarization axis direction of polarized light to be transmitted is set within a range of ±2°, preferably ±0.5°. In the first and second sapphire substrates 19 and 20, since a direction of the polarized light to be transmitted is different, these sapphire substrates 19 and 20 are arranged, accordingly.

This arrangement ensures that a polarized light shaped by the polarizer film 13 does not generate light rotation resulting from a birefringence in sapphire crystal. For example, in the case where an angle exceeds the aforesaid angular range, an influence such as disturbance is caused in an image projected from the projector.

Moreover, in the case where the primary plane of the sapphire substrates 19 and 20 is the R-plane, a silicon film can be formed on the surface by epitaxial growth, and thereby, the silicon film becomes a single crystal (SOS=Si ON SAPPHIRE). Therefore, it is possible to obtain an effect such that a thin-film transistor characteristic using the silicon film is greatly improved. Whereby a display speed can be greatly improved, and also, a power consumption can be reduced.

The first and second sapphire substrates 19 and 20 constituting the liquid crystal panel 8 has a sufficient heat radiating property or effect. Thus, there is no need of specially providing a polarizing plate, and the polarizer films 13 may be bonded directly to the outer surfaces of the first and second sapphire substrates 19 and 20. By doing so, these first and second sapphire substrates 19 and 20 can be also used as the retaining plates of the polarizer films 13, thereby making it possible to make compact an optical path, and to provide a low cost structure.

In addition, by employing a structure in which the polarizer film 13 is separated from the liquid crystal panel, a more sufficiently cooling effect can be obtained. The first and second sapphire substrates 19 and 20 may be set to a thickness of 2 mm or more, and thereby, it is possible to improve a deterioration of image quality due to a dust adhered to the panel surface by means of a defocus effect.

Figure 10:
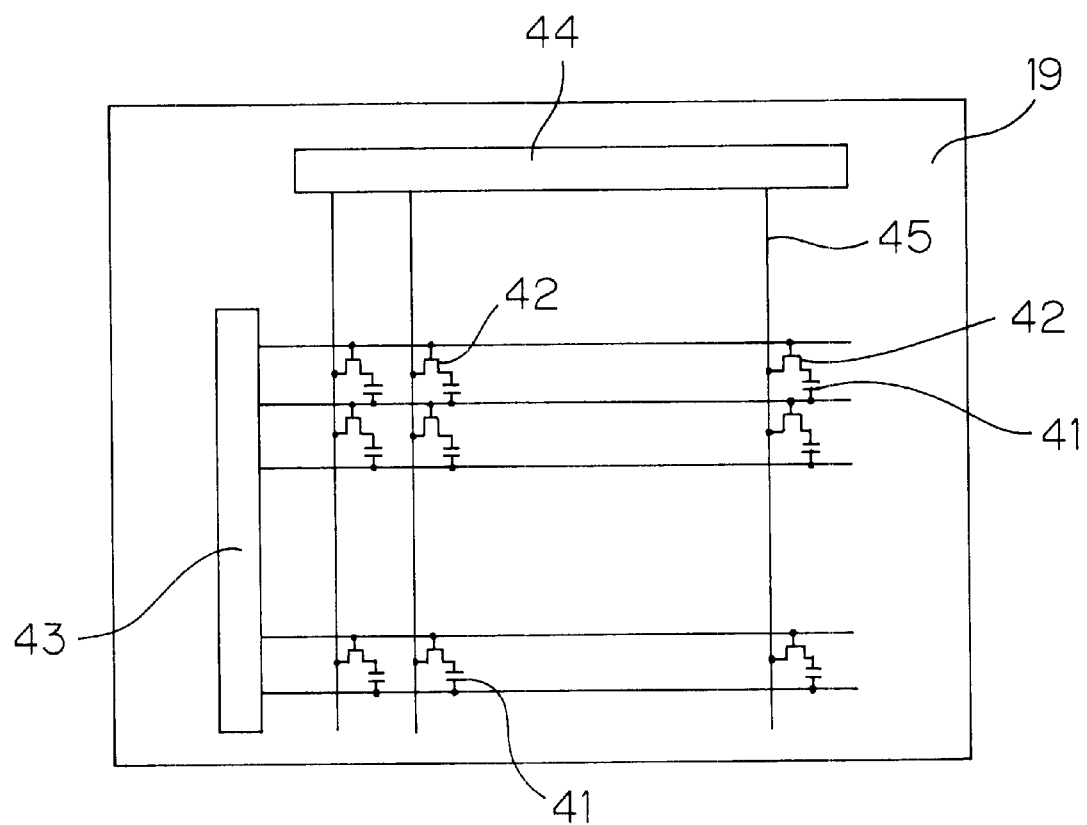
FIG. 10 is a view showing a circuit configuration of the liquid crystal display device according to still another embodiment of the present invention.

Next, FIG. 10 shows a circuit configuration of a liquid crystal panel in the case of using the first sapphire substrate 19 whose primary plane is an R-plane. As shown in FIG. 10, pixels 41 are arranged like a matrix on the first sapphire substrate 19. Each pixel 41 is provided with a SOSMOS transistor switch 42 which is formed of a single crystal silicon by epitaxial growth on the sapphire substrate 19. Further, the first sapphire substrate 19 is formed with a vertical scanning circuit 43 for driving a gate of the SOSMOS transistor switches 42, and a horizontal scanning circuit 44 for transferring a video signal to each signal line 45 in order. Also, MOS transistors required for these vertical scanning circuit 43 and horizontal scanning circuit 44 are formed of SOSMOS transistors.

Figure 11:
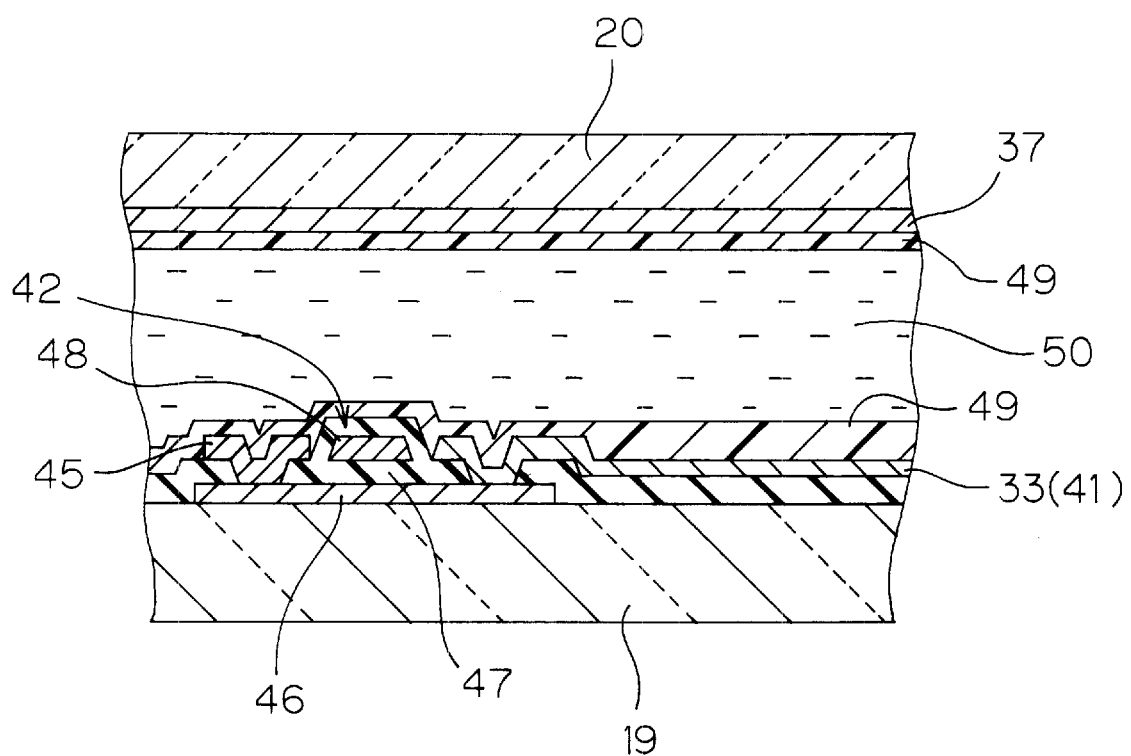
FIG. 11 is a cross sectional view schematically showing a unit pixel and a SOSMOS transistor switching section of the liquid crystal display device shown in FIG. 10.

FIG. 11 shows a schematically cross section of the unit pixel 41 and the SOSMOS transistor switch 42 in the liquid crystal display device.

A single crystal silicon layer 46 is formed on the primary plane of the first sapphire substrate 1 by epitaxial growth so that a crystal orientation of the primary plane becomes an R-plane, and then, impurities are doped in the formed single crystal silicon layer so as to form a thin film transistor. Further, a gate 48 insulated by a $SiO_2$ layer 47 is formed on the thin film transistor, and thus, a SOSMOS transistor 42 is formed as a whole.

One end of the SOSMOS transistor switch 42 is connected to the signal line 45 to which the video signal from the horizontal scanning circuit 44 is transferred. Another end of the SOSMOS transistor switch 42 is connected to a transparent electrode 33 (pixel 41) formed of an ITO and the like, and thus, a pixel 41 is constituted. Further, a transparent electrode 37 is formed on the sapphire substrate 20 facing the sapphire substrate 19 on which the pixels 41 and SOSMOS transistor switches 42 are formed, and liquid crystal alignment layers 49 are interposed so that a liquid crystal 50 is held between these alignment layers.

Then, when the gate of each SOSMOS transistor switch 42 is driven by means of the vertical scanning circuit 43, a video signal flows through the transparent electrode 33 (pixel 41) from the signal line 45,and thus, the pixel 41 is operated.

Although not illustrated, MOS transistors used in the horizontal scanning circuit 44 and the vertical scanning circuit 43 are also comprised of SOSMOS transistor switches. More specifically, in the same manner as described above, the MOS transistors are comprised of thin film transistors which are formed of a single crystal silicon formed by epitaxial growth on the sapphire substrate 19.

In the liquid crystal display device of this embodiment, the single crystal silicon layer 46 is used for forming thin film transistors. The single crystal silicon layer 46 has almost no defect and, therefore, a leakage current is small, and a power consumption can be reduced. Further, since the single crystal silicon layer 46 has a high current response, it is possible to make high an operating speed, and to prevent a pixel shift in a displayed image. For example, in comparison with a mobility of electron, as shown in Table 3, a single crystal silicon shows a mobility of about three times as much as polysilicon.

TABLE 3

|  |  | Electron mobility ($cm^2$/V.sec) |
|---|---|---|
| Present Invention | SOS single crystal silicon film | 300~400 |
| Comparative Example | Polysilicon | 40~150 |

In addition, the liquid crystal display device of this embodiment can be readily manufactured by a conventional C-MOS process technology of single crystal silicon because the sapphire substrate 19 is used. Further, because the sapphire substrate is usable in a high temperature process of 1000° C. or more, production line of a semiconductor may be employed.

The above embodiment has described the process and structure in which a single crystal silicon film is formed, and thus, a liquid crystal panel is manufactured. The sapphire substrate is applicable to a high temperature process of a polycrystal silicon (p-Si) TFT manufacturing process without problems, and therefore, a liquid crystal panel can be manufactured without problems.

Figure 12:
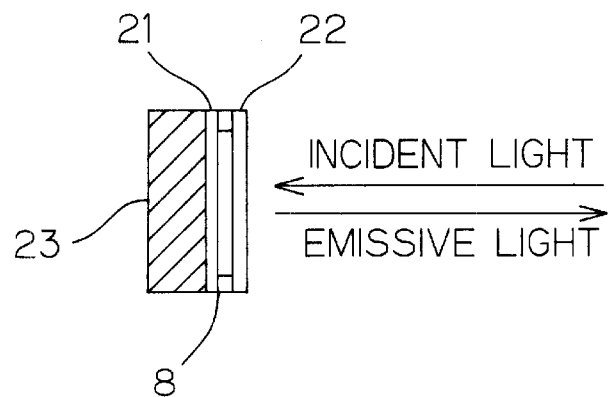
FIG. 12 is a view showing a liquid crystal panel according to still another embodiment of the present invention.

FIG. 12 shows an embodiment in the case where the present invention is applied to a reflection type liquid crystal panel 8. In this case, the liquid crystal panel 8 is constructed in a manner that a liquid crystal is encapsulated between a transparent substrate 21 on which reflective electrodes and switching elements are formed, and an incidence/emission side transparent substrate 22 on which a facing electrode is formed. Sapphire substrates are used as these transparent substrates 21 and 22. This construction can also improve a heat radiating effect.

Since the sapphire substrate used as the transparent substrate 21 has no influence to a polarized light characteristic, its axis and crystal orientation may be arbitrary. Only reflective surface side of the transparent substrate may be subjected to mirror polishing. A radiation heat sink 23 may be attached directly to the back side of the transparent substrate 21. On the other hand, in the sapphire substrate used as the incidence/emission side transparent substrate 22, since an incident light and a reflected emissive light are different in a polarizing direction, the primary plane is set within C-plane ±2°, preferably, ±0.5° so that no light rotation is generated with respect to a polarized light.

Another embodiment of the present invention will be described below.

In the case where a high definition image display is required, the projector for enlarging and projecting an image employs the following system regardless of being any of a transmission liquid crystal type, a reflective liquid crystal type and a DLP type. More specifically, as shown in FIG. 2, the light source color is separated into three color lights of RGB, and an image corresponding to each color of RGB is displayed, and further, is synthesized by using a prism or the like.

In this case, the dichroic mirrors 10, which perform a function separating a color of the light source 1, are formed of sapphire substrates, and then, the surface of each of the sapphire substrate is formed with a film which selects a wavelength of the light source 1, and carries out transmission/reflection.

Whereby it is possible to effectively radiate a heat accumulated in dichroic mirrors 10, and thus, to reduce a temperature of the whole system. In the sapphire substrates used as described above, a C axis or the C-axis projection line direction or an axis perpendicular to the C axis is set within ±2°, preferably, ±0.5° with respect to a polarizing transmission axis adjusted after or before transmission. Or the primary plane of the sapphire substrate is set within a C-plane ±2°, preferably, ±0.5°.

In still another embodiment, a sapphire substrate is used in an infrared ray cut filter 3 for preventing an infrared ray from the light source 1 of unnecessary heating factor from being incident upon an optical system, and an infrared cut film may be formed on the surface of the sapphire substrate. In this case, since the filter 3 is arranged just after the light source 1 which is cooled by using a cooling fan, it is possible to effectively improve a heat radiating effect by cooling the filter 3 by means of the cooling fan. As a result, a temperature reduction effect of the whole system can be greatly improved.

In the sapphire substrate used as described above, a C axis or the C axis projection line direction or a direction perpendicular to the C axis is set within ±2°, preferably, ±0.5° with respect to a polarizing transmission axis adjusted after or before transmission. Or the primary plane of the sapphire substrate is set within a C-plane ±2°, preferably, ±0.5°.

Figure 13:
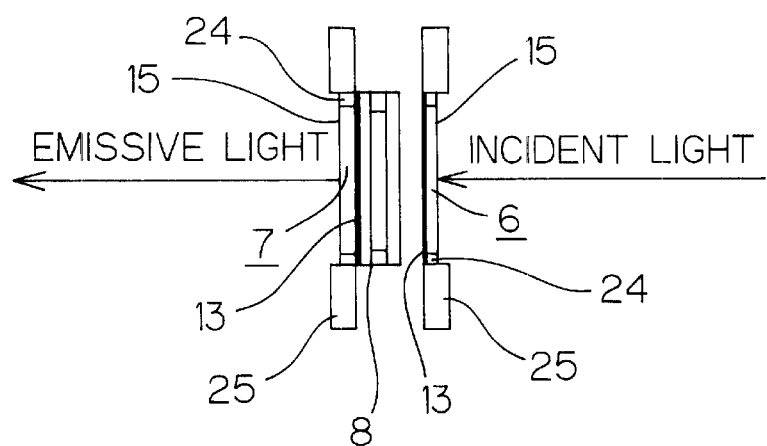
FIG. 13 is a view showing a liquid crystal panel according to still another embodiment of the present invention.

A metallic radiation fin may be bonded to the above sapphire substrate. For example, as shown in FIG. 13, metallized layers 24 such as of Mo—Mn is formed on outer peripheries of the sapphire substrates used as the retaining plates of the polarizers 6 and 7, and then, metallic radiation fins 25 are brazed thereto.

In this case, a heat accumulated in the polarizer film 13 is conducted to the retaining plate 15 made of sapphire, and further, is effectively conducted to the metallic radiation fin 25 having a high heat conductivity. Then, a surface area of the metallic radiation fin 25 is made large so as to improve a heat radiating effect, and the radiation fin 25 may be cooled by a cooling fan, and thereby, a cooling effect can be further improved.

According to an experiment, a temperature reduction effect of 5 to 10° C. was improved as compared with the case that only sapphire substrates were used. whereby it is possible to satisfy a stable operating condition further lower than 70° C. which is a characteristic guarantee temperature of the polarizer film 13.

In this embodiment, Mo—Mn metallization method has been employed. In the case of manufacturing the metallic radiation fin by employing an active metalizing method, the same effect can be also obtained.

A general resin frame (mold) used for positioning an optical system may be replaced by one formed of a material such as aluminum having high heat conductivity, and thereby, a heat is effectively conducted and, as a result, the whole system can have a heat radiating structure.

Still another embodiment of the present invention will be described below.

Figure 14:
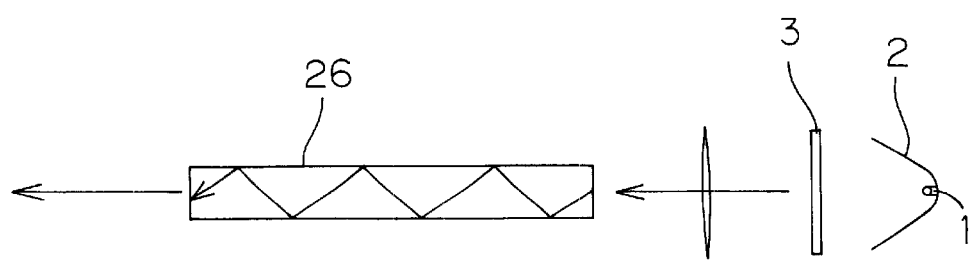
FIG. 14 is a view showing still another embodiment of the present invention.

In the projector for enlarging and projecting an image, as shown in FIG. 14, a rod type integrator lens 26 for diffusing light from the light source 1 of high luminance lamp is formed of sapphire.

The sapphire is a transparent material having a high refractive index of No=1.768. Thus, in the case where a quadrangular prism integrator lens 26 is manufactured with the use of sapphire, it is possible to set a total reflection angle smaller. Therefore, it is possible to greatly improve diffusion as compared with the case where the integrator lens is manufactured with the use of an optical glass such as quartz or the like. Further, it is possible to make a design such that a dimension of the integrator lens is made compact.

Whereby it is possible to improve a uniformity of image luminance by the liquid crystal projector, and also, to improve a heat radiating effect. An antireflection coat may be applied to end faces of the quadrangular prism, which are an incident face and an emissive face of the integrator lens 26, and thereby, it is possible to improve a transmission efficiency.

Next, the following is a description on a manufacturing process of sapphire used in the present invention.

Figure 15:
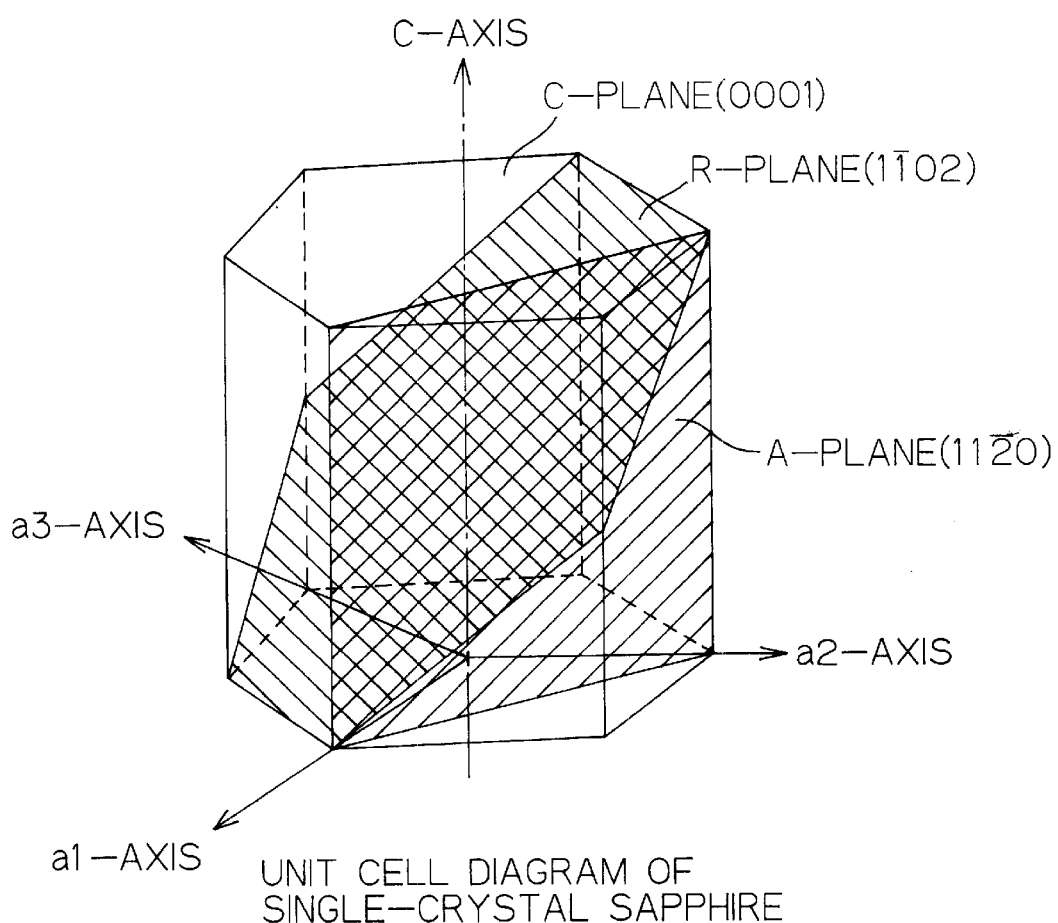
FIG. 15 is a view showing a crystal structure of sapphire.

A single crystal sapphire is a single crystal of alumina ($Al_2O_3$), and an aluminum atom and an oxygen atom are arranged so as to form a crystal. As shown in FIG. 15, sapphire has a hexagonal system, and its center axis is a C-axis, and a plane vertical to the C-axis is a C-plane (0001). A plane vertical to an A-axis (a1, a2, a3) radially extending from the C-axis is an A-plane (11$\bar{2}$0). An R-plane exists in a state of having a predetermined angle (about 32.382°) with respect to the C-axis. These axes and planes can be analyzed by an X-ray diffraction.

The single crystal sapphire used in the present invention is manufactured by an EFG (Edge-defined Film-fed Growth) method, for example. More specifically, high purity alumina is melt in an inert atmosphere, and then, a molybdenum die for a single crystal growth of ribbon-like sapphire including a slit in its interior is positioned so as to contact with the alumina molten solution. Then, the alumina molten solution is guided to an upper end portion of the molybdenum die by a capillary action so as to contact with a seed crystal. Subsequently, the seed crystal is upwardly pulled up, and then, sapphire which is a single crystal alumina is grown. When pulling up and growing a substrate raw material, a primary plane of the seed crystal is set as a growth crystal orientation, and its growth axis is set as a pull-up axis, and thus, the seed crystal is pulled up. By pulling up the seed crystal in this manner, it is possible to readily obtain a desired plane and crystal axis orientation of the primary plane, and thus, to accurately grow a single crystal sapphire.

The single crystal sapphire growth method is not limited to the EFG method, and other methods such as a Czochralski method may be employed. In the case of obtain an angular-shaped crystal, the EFG method of accurately obtaining a plate-shaped crystal is adaptable because a cylindrical-shaped crystal has a worse efficiency.

The single crystal sapphire thus obtained is subjected to grinding by a diamond wheel or the like so as to obtain a desired shape, and thereafter, is subjected lapping with the use of diamond abrasives.

Next, the single crystal sapphire and an abrasive cloth are relatively slid while supplying a liquid in which $SiO_2$ colloidal ball particles having a grain size of 50 nm or less are scattered, as an abrasive slurry, and then, CMP (Chemical Mechanical Polishing) is carried out. This polishing process advantageously removes a fracture layer generated by the aforesaid grinding and lapping without newly causing a strain, so as to obtain a preferable smooth surface which is excellent in a transmission property even in the case of using the single crystal sapphire as a substrate.

Next, the following Table 4 shows characteristic values of the result of comparing the sapphire with a silica glass, BK-7 (trade name: made of Hoya glass Co., Ltd.) and a blue sheet glass (float glass), which are a currently used transparent material.

TABLE 4

Characteristic data

|  | Sapphire | Silica glass (synthesis) | BK7 | Blue sheet glass |
|---|---|---|---|---|
| Melting point (° C.) | 2053 | 1600 | 870 | 720 |
| Bending strength (MPa) | 690 | 670 | 590 | 643 |
| Young's modulus (MPa) | $4.7 \times 10^5$ | $7.3 \times 10^4$ | $7.2 \times 10^4$ | $7.2 \times 10^4$ |
| Thermal conductivity (W/m.K) | 42.0 | 1.2 | 1.0 | 0.8 |
| Vickers hardness | 2300 | 900 | 570 | 548 |
| Refractive index at 589 nm | No = 1.768 Ne = 1.760 | Nd = 1.459 | Nd = 1.517 | Nd = 1.52 |
| Thermal expansion coefficient | C-axis parallel: $5.3 \times 10^{-6}$/K C-axis vertical: $4.5 \times 10^{-6}$/K (25° C.) | $0.51 \times 10^{-6}$/K (0–100° C.) | $9.8 \times 10^{-6}$/K (25–350° C.) | $8.5 \times 10^{-6}$/K (25–350° C.) |

As is apparent from the above Table 4, the sapphire is superior in heat conductivity and is also superior in heat radiating effect. It is also apparent that the sapphire has a high refractive index and, therefore, a high characteristic value can be obtained in the case where the sapphire is used as an integrator lens.

Moreover, the sapphire has a high strength and, therefore, it is possible to make a design of making the sapphire thin as compared with other materials, and to make a design of a compact optical system as a whole. In addition, the sapphire is excellent in a heat resistance and, therefore, the sapphire is applicable to a high temperature process of a manufacturing process of a polycrystal silicon (p-Si) TFT constituting a liquid crystal panel without problem.

As this invention may be embodied in several forms without departing from the sprit of essential characteristics thereof, the aforesaid embodiments are therefore illustrative and not restrictive. Since the scope of the invention is defined by the appended claims rather than by the description preceding them, and all changes that fall within metes and bounds of the claims, or equivalence of such metes and bounds thereof are therefore intended to be embraced by the claims.

This application claims the convention priority on the basis of Patent Application No. 11-52061 filed on Mar. 1, 1999 with the Japanese Patent Office, and Patent Application No. 10-371720 filed on Dec. 28, 1998 with the Japanese Patent Office, and the disclosure of these applications is fully incorporated herein by reference.

What is claimed is:

1. A projection-type liquid crystal display device comprising:
   a light source;
   a liquid crystal panel, wherein the liquid crystal panel includes a transparent substrate;
   a lens; and
   a polarizer having a polarizer film and a retaining plate for retaining the polarizer film,
   wherein at least any one of the lens, the retaining plate and the transparent substrate is comprised of a sapphire substrate, and
   wherein light from the light source is transmitted through the lens, the polarizer and the liquid crystal panel so as to be projected, and
   wherein the sapphire substrate is constructed in a manner that an angle made by a C-axis direction or C-axis projection line direction and a polarized light transmission axis is set within a range of ±2°, or an angle made by an axis perpendicular to the C-axis and a polarized light transmission axis is set within a range of ±2°, or an angle made by a C-plane and a plane vertical to a transmission direction of a polarized light to be transmitted is set within a range of ±2°.

2. A projection-type liquid crystal display device according claim 1, wherein an antireflection coating is applied onto a surface of the sapphire substrate.

3. The projection-type liquid crystal display device according to claim 1,
   wherein the sapphire substrate is attached onto an outer surface of the liquid crystal panel so that a space of 0.1 mm or less interposed between the outer surface of the liquid crystal panel and an opposed outer surface of the sapphire substrate is sealed.

4. A projection-type liquid crystal display device according claim 3, further comprising:
   a metallic radiation fin is bonded to the sapphire substrate.

5. A projection-type liquid crystal display device according claim 3, further comprising:
   a second sapphire substrate facing the first sapphire substrate;
   wherein the liquid crystal panel is sandwiched between the first sapphire substrate and the second sapphire substrate.

6. A projection-type liquid crystal display device according claim 3 wherein the sapphire substrate is attached onto an outer surface of the liquid crystal panel, and a light shielding layer having a window of a size larger by 0.1 mm or more than an effective pixel area of the liquid crystal panel is applied to the sapphire substrate.

7. A projection-type liquid crystal display device according claim 3 wherein an antireflection coating is applied onto a surface of the sapphire substrate.

8. The projection-type liquid crystal display device according to claim 1,
   wherein the sapphire substrate is attached onto an outer surface of the liquid crystal panel, and a light shielding layer having a window of a size larger by 0.1 mm or more than a size of the effective pixel of the liquid crystal panel is applied to the sapphire substrate.

9. A projection-type liquid crystal display device according claim 8, further comprising:
   a metallic radiation fin is bonded to the sapphire substrate.

10. A projection-type liquid crystal display device according clam 8, wherein an antireflection coating is applied onto a surface of the sapphire substrate.

11. A projection-type liquid crystal display device according claim 8 further comprising:
    a second sapphire substrate facing the first sapphire substrate;
    wherein the liquid crystal panel is sandwiched between the first sapphire substrate and the second sapphire substrate.

12. A projection-type liquid crystal display device comprising:
    a light source;
    a wavelength selective optical component for transmitting or reflecting light having a specific wavelength band;
    a liquid crystal panel, wherein the liquid crystal panel includes a transparent substrate;
    a lens; and
    a polarizer having a polarizer film and a retaining plate for retaining the polarizer film,
    wherein at least any one of the wavelength selective optical component, the lens, the retaining plate and the transparent substrate is comprised of a sapphire substrate,
    wherein light from the light source is transmitted through the lens, the polarizer and the liquid crystal panel so as to be projected, and
    wherein the sapphire substrate is constructed in a manner that an angle made by a C-axis direction or C-axis projection line direction and a polarized light transmission axis is set within a range of ±2°, or an angle made by an axis perpendicular to the C-axis and a polarized light transmission axis is set within a range of ±2°, or an angle made by a C-plane and a plane vertical to a transmission direction of a polarized light to be transmitted is set within a range of ±2°.

13. A projection-type liquid crystal display device according claim 12, wherein an antireflection coating is applied onto a surface of the sapphire substrate.

14. A projection-type liquid crystal display device comprising:
    a light source;
    a liquid crystal panel, wherein the liquid crystal panel includes a transparent substrate;
    a lens; and
    a polarizer having a polarizer film and a retaining plate for retaining the polarizer film,
    wherein at least any one of the lens, the retaining plate and the transparent substrate is comprised of a sapphire substrate, and
    wherein light from the light source is transmitted through the lens, the polarizer and the liquid crystal panel so as to be projected, and
    wherein the lens is a rod-type integrator lens for diffusing light from the light source, and the integrator lens is formed of sapphire.

15. A projection-type liquid crystal display device comprising:
    a light source;
    a wavelength selective optical component for transmitting or reflecting light having a specific wavelength band;

a liquid crystal panel, wherein the liquid crystal panel includes a transparent substrate;

a lens; and a polarizer having a polarizer film and a retaining plate for retaining the polarizer film, wherein at least any one of the wavelength selective optical component, the lens, the retaining plate and the transparent substrate is comprised of a sapphire substrate, wherein light from the light source is transmitted through the lens, the polarizer and the liquid crystal panel so as to be projected, and wherein the lens is a rod-type integrator lens for diffusing light from the light source, and the integrator lens is formed of sapphire.

16. A projection-type liquid crystal display device comprising:

a liquid crystal panel having a first sapphire substrate and a second sapphire substrate used as a pair of transparent substrates facing each other with a liquid crystal layer sandwiched therebetween, wherein the primary plane of the first sapphire substrate is any one of an R-plane, an A-plane, an M-plane and a C-plane, wherein the primary plane of the second sapphire substrate is any one of an R-plane, an A-plane, an M-plane and a C-plane, wherein the first sapphire substrate and the second sapphire substrate face each other so that each specific crystal axis thereof substantially coincide with a polarization transmission axis of polarized light to be transmitted, and the liquid crystal panel further includes:

pixels which are arranged in a matrix on the first sapphire substrate so as to be aligned with the specific crystal axis direction of the first sapphire substrate;

a vertical scanning circuit and a horizontal scanning circuit which are formed with the use of a thin film transistor comprised of silicon made by epitaxial growth on the first sapphire substrate, and send a video signal to the pixels; and a transparent electrode formed on the second sapphire substrate.

17. A projection-type liquid crystal display device according claim 16 further comprising:

a metallic radiation fin is bonded to the sapphire substrate.

18. The liquid crystal display device according to claim 16, wherein the pixels are arranged in a matrix so as to be substantially parallel with or perpendicular to the specific crystal axis direction of the first sapphire substrate.

19. A liquid crystal display device according to claim 16, wherein the first and second sapphire substrates are constructed in a manner that an angle made by each specific crystal axis thereof and a polarization transmission axis of a polarized light to be transmitted is set within a range of ±2°.

20. A liquid crystal display device according to claim 16, wherein each specific crystal axis of the first and second sapphire substrates is an A-axis or C-axis projection line direction in the case where its primary plane is an R-plane, is a C-axis or M-axis direction in the case where its primary plane is an A-plane, is a C-axis or A-axis direction in the case where its primary plane is an M-plane, and is an A-axis or M-axis direction in the case where its primary plane is a C-plane.

* * * * *